US011305604B2

(12) United States Patent
    Woenarta

(10) Patent No.: US 11,305,604 B2
(45) Date of Patent: Apr. 19, 2022

(54) VIBRATION DAMPER AND VEHICLE

(71) Applicants: ThyssenKrupp Bilstein GmbH, Ennepetal (DE); thyssenkrupp AG, Essen (DE)

(72) Inventor: Freddy Woenarta, Braunschweig (DE)

(73) Assignees: THYSSENKRUPP BILSTEIN GMBH, Ennepetal (DE); THYSSENKRUPP AG, Essen (DE)

(*) Notice: Subject to any disclaimer, the term of this patent is extended or adjusted under 35 U.S.C. 154(b) by 66 days.

(21) Appl. No.: 16/825,596

(22) Filed: Mar. 20, 2020

(65) Prior Publication Data
    US 2020/0307343 A1   Oct. 1, 2020

(30) Foreign Application Priority Data
    Mar. 28, 2019  (DE) ............... 10 2019 108 070.3

(51) Int. Cl.
    | | |
    |---|---|
    | *B60G 17/08* | (2006.01) |
    | *B60G 13/06* | (2006.01) |
    | *F16F 9/348* | (2006.01) |
    | *F16F 9/19* | (2006.01) |
    | *F16F 9/34* | (2006.01) |
    | *F16F 9/516* | (2006.01) |
    (Continued)

(52) U.S. Cl.
    CPC ............ *B60G 17/08* (2013.01); *B60G 13/06* (2013.01); *F16F 9/19* (2013.01); *F16F 9/34* (2013.01); *F16F 9/348* (2013.01); *F16F 9/516* (2013.01); *F16K 11/22* (2013.01); *F16K 15/148* (2013.01); *B60G 2202/24* (2013.01); *B60G 2206/41* (2013.01); *B60G 2500/114* (2013.01); *B60G 2800/162* (2013.01); *F16F 2222/12* (2013.01); *F16F 2228/066* (2013.01)

(58) Field of Classification Search
    CPC ........ B60G 13/06; B60G 13/08; B60G 17/08; F16F 9/34; F16F 9/46; F16F 9/85; F16F 9/325; F16F 9/348; F16F 9/35
    USPC ........ 188/282.1, 282.5, 282.6, 322.13, 322.2
    See application file for complete search history.

(56) References Cited

U.S. PATENT DOCUMENTS 5,293,971 A * 3/1994 Kanari ................... F16F 9/468
                                                       188/282.1
5,586,627 A * 12/1996 Nezu ....................... B60G 17/08
                                                        188/266.6
(Continued)

FOREIGN PATENT DOCUMENTS

| CN | 103991352 A | 8/2014 |
| CN | 107627804 A | 1/2018 |

(Continued)

*Primary Examiner* — Christopher P Schwartz
(74) *Attorney, Agent, or Firm* — thyssenkrupp North America, LLC

(57) ABSTRACT

A vibration damper for a motor vehicle having at least one damper tube, which includes at least one damper fluid, a piston rod having a piston, which is guided axially in the damper tube, and at least one valve unit. The valve unit includes at least three flow paths for the damper fluid. The first flow path includes a first valve for a first damper setting. The second flow path includes a second valve for a second damper setting and a variable throttle. The third flow path includes a check valve, wherein the second damper setting is softer than the first damper setting and the cross section of the second flow path is adjustable at least partially by the variable throttle.

13 Claims, 3 Drawing Sheets

(51) Int. Cl.
 *F16K 15/14* (2006.01)
 *F16K 11/22* (2006.01)

(56) References Cited

U.S. PATENT DOCUMENTS

| | | | | |
|---|---|---|---|---|
| 5,588,510 | A | | 12/1996 | Wilke |
| 5,788,030 | A | * | 8/1998 | Rottenberger ............ F16F 9/34 188/290 |
| 5,934,421 | A | * | 8/1999 | Nakadate ................ F16F 9/348 188/299.1 |
| 5,960,915 | A | * | 10/1999 | Nezu ....................... F16F 9/325 188/266.6 |
| 6,079,526 | A | * | 6/2000 | Nezu ........................ F16F 9/46 188/266.6 |
| 7,273,138 | B2 | * | 9/2007 | Park ......................... F16F 9/46 188/322.2 |
| 7,770,983 | B2 | * | 8/2010 | Park ....................... F16F 9/465 303/117.1 |
| 8,307,965 | B2 | * | 11/2012 | Foster .................... F16F 9/512 188/318 |
| 10,421,330 | B2 | * | 9/2019 | Jeong .................. B60G 17/019 |
| 2002/0121416 | A1 | * | 9/2002 | Katayama ................ F16F 9/064 188/314 |
| 2005/0067238 | A1 | * | 3/2005 | Deferme ................. F16F 9/348 188/282.5 |
| 2011/0290603 | A1 | * | 12/2011 | Yabe ....................... F16F 9/348 188/282.1 |
| 2014/0224606 | A1 | | 8/2014 | Baales et al. |
| 2018/0015802 | A1 | | 1/2018 | Jeong |
| 2018/0355940 | A1 | * | 12/2018 | Manger .................. F16F 9/325 |
| 2019/0017566 | A1 | | 1/2019 | Yan |
| 2019/0126950 | A1 | * | 5/2019 | Ogawa ................. F16F 15/023 |

FOREIGN PATENT DOCUMENTS

| | | | |
|---|---|---|---|
| CN | 206983659 U | | 2/2018 |
| CN | 109073024 | | 12/2018 |
| DE | 39 25 470 A | | 3/1990 |
| DE | 198 57 068 A | | 6/1999 |
| DE | 697 08 512 T | | 5/2002 |
| DE | 10 2005 053 394 A | | 5/2006 |
| DE | 10 2010 011 912 A | | 9/2011 |
| DE | 10 2011 115 969 A | | 4/2012 |
| DE | 10 2017 106 802 A | | 10/2018 |
| EP | 0 591 754 A | | 4/1994 |
| EP | 1531066 A1 * | 5/2005 | ............ B60G 17/08 |
| EP | 1 688 281 A | | 8/2006 |
| JP | H04-160 241 A | | 6/1992 |
| JP | H116539 A | | 1/1999 |
| JP | 2009205153 A | | 9/2009 |

\* cited by examiner

VIBRATION DAMPER AND VEHICLE

CROSS REFERENCE TO RELATED APPLICATION

This application is a U.S. Non-Provisional Patent Applications, which claims priority to German Patent Application No. DE 10 2019 108 070.3, filed Mar. 28, 2019, the entire content of which is incorporated herein by reference.

FIELD

The present disclosure generally relates to a vibration damper.

BACKGROUND

A vibration damper is known for example, from German Patent Application No. DE 10 2005 053 394 A1.

DE 10 2005 053 394 A1 describes a vibration damper having a cylinder, which is enclosed by a tube. In the cylinder is arranged a piston rod with a piston. Moreover, the vibration damper comprises two adjustable damper valves. The adjustable damper valves are arranged externally on the vibration damper and are fluidically connected to the cylinder. The adjustable damper valves allow an adaptive behaviour for the damping during a compression and a rebound stage of the vibration damper. More precisely, it can be switched as needed between a hard and a soft damping. Check valves are used so that the flow of a damping fluid between the two damper valves can be distinctly associated with a stage.

In the above described prior art, an annular space is formed between the cylinder and the tube. The check valve is arranged in the annular space. The check valve is arranged such that, during the compression stage, it allows the flow of the damping fluid from an equalizing space through a fluid connection into the working space at the piston rod side.

Vibration dampers having multiple damper settings and able to be switched between the different damper settings are known as adaptive vibration dampers. In adaptive vibration dampers, one distinguishes between active and passive systems. In passive systems, the driver can switch by pressing a button between a hard damping for a sporty driving behaviour and a soft damping for a comfortable driving behaviour. Active systems, on the other hand, adapt themselves independently to the particular roadway conditions. This occurs, for example, by the use of sensors and actuators, which are connected to an open-loop or closed-loop control unit.

Adaptive vibration dampers require more design space than conventional vibration dampers. Such vibration dampers are very complex and for this reason they are more costly than conventional vibration dampers.

Thus, a need exists for a vibration damper with a compact design, so that design space can be saved, and which can be realized with little cost outlay at the same time.

DETAILED DESCRIPTION

Figure 1:
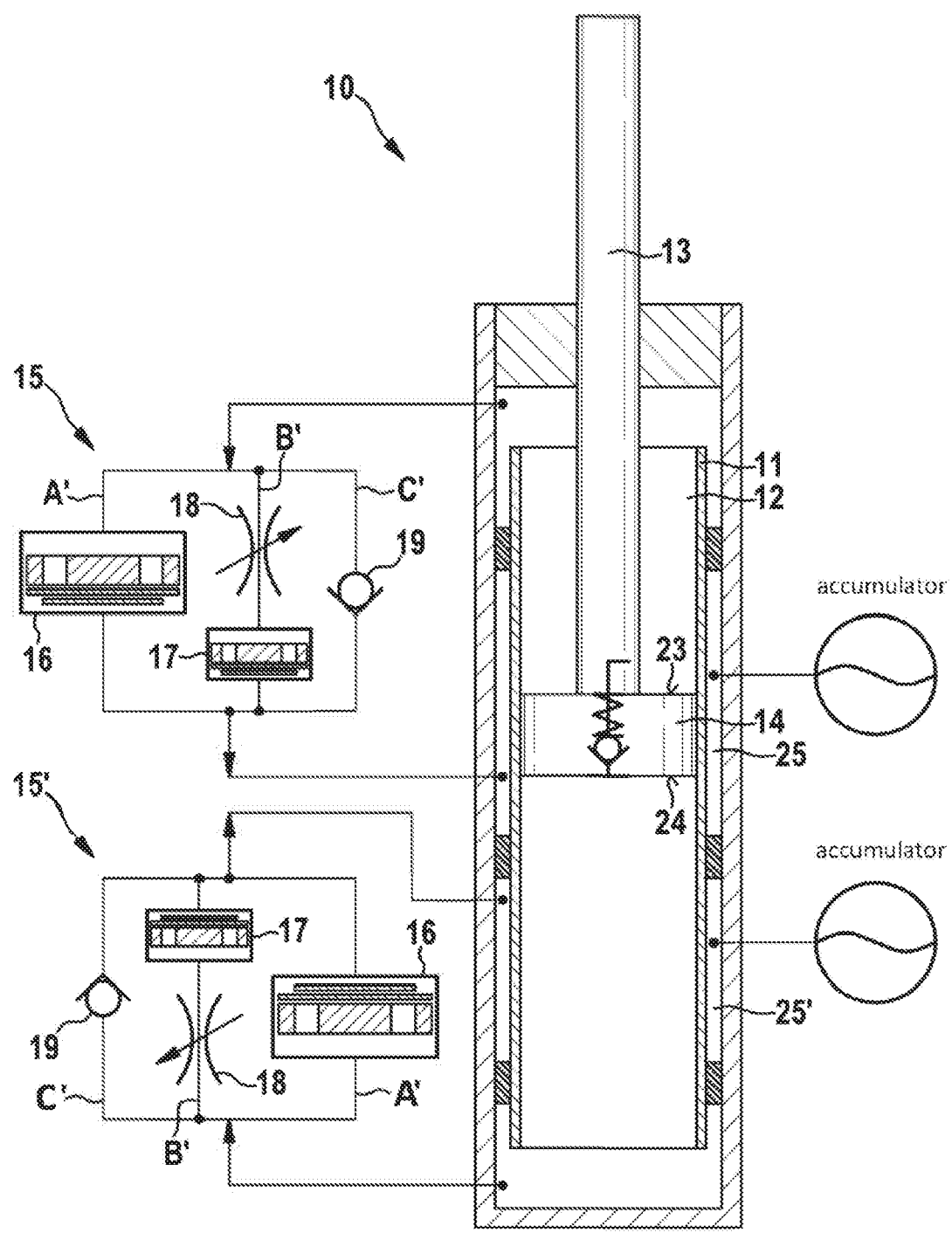
FIG. 1 is a schematic view of an exemplary embodiment of a vibration damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a vibration damper and the invention relates to a vehicle having such a vibration damper.

Specifically, the problem is solved by a vibration damper for a motor vehicle having at least one damper tube, which comprises at least one damper fluid, a piston rod having a piston, which is guided axially in the damper tube, and at least one valve unit. The valve unit comprises at least three flow paths for the damper fluid, the first flow path comprising a first valve for a first damper setting, the second flow path comprising a second valve for a second damper setting and a variable throttle, and the third flow path comprising a check valve. The second damper setting is softer than the first damper setting and the cross section of the second flow path is adjustable at least partially by the variable throttle.

When the throttle is open, i.e., at maximum cross section of the second flow path, the second valve can be subjected to pressure by the damper fluid. The first and the second valve each have a limit pressure. By limit pressure is meant the particular pressure at which a respective valve opens. The limit pressure of the first valve is higher than the limit pressure of the second valve. Accordingly, the pressure for opening the first valve must be greater than the pressure which is applied to the second valve. In other words, the first damper setting is harder than the second damper setting. The case of reaching the limit pressure of the first valve when the throttle is open usually cannot be achieved. The limit pressure of the second valve is reached before the limit pressure of the first valve is set. Hence, the second valve opens, so that the pressure acting on the valves decreases until the second valve closes again.

When the throttle is closed or partly closed, the second valve is only subjectable to little pressure or no pressure at all. Hence, it is possible to reach the higher limit pressure of the first valve.

In operation with a partly closed throttle it is conceivable that vibrations with low amplitudes can be dampened by the second flow path and vibrations with large amplitude by the first flow path. Vibrations with large amplitudes cause a greater pressure, which can build up fast enough to open the first valve when the throttle is partly open. At low amplitudes, the limit pressure of the first valve is not reached and the damper fluid flows through the second valve.

The check valve is arranged in the third flow path. The check valve allows the damper fluid to flow back through the valve unit almost free of resistance. The check valve allows a flow of the damper fluid in the direction opposite the flow direction of the first and the second valve.

The first valve has a hard damping and can thus be called a hard valve. The second valve has a soft damping. Thanks to the soft damping, the driving comfort can be improved. Therefore, the second valve can be called a comfort valve.

The movement of the damper fluid and thus the damper setting can be selected by the variable throttle. It is conceivable to realize two or more damper settings in this way. The variable throttle enables an adaptive setting of the vibration damper. The vibration damper according to the invention can be used as a passive and/or active adaptive vibration damper.

The following benefits are achieved with the vibration damper according to the invention. The vibration damper according to the invention comprises at least one valve unit having three flow paths and three valves. This makes it possible to reduce the number of required flow paths and valves in the damper tube. In particular, no check valve is needed in the damper tube. Moreover, a better package is possible, i.e., a more compact design. The more compact design is possible because fewer components are required. The fewer number of components has an advantageous impact on the costs of the vibration damper.

Preferred embodiments of the invention are indicated in the dependent claims.

Especially preferably, the three flow paths are arranged in parallel. The variable throttle regulates the flow through the second flow path. The first and the second valve are pressure-dependent. The first and second valve can respectively receive a flow only in one direction, i.e., the first and second valve only allow one flow direction.

In an especially preferred embodiment, the variable throttle comprises at least one rotary valve having a through opening, which is formed at least for a portion as a hollow cylinder, especially a sleeve-shaped, and at least one part of the cross section of the second flow path is adjustable by a rotation of the rotary valve.

Advantageously, the second flow path has a cylindrical segment, comprising a through opening in an outer wall. The rotary valve is arranged to be movable on the outer wall; in particular, it can turn about its central longitudinal axis. The cross section of the through opening can be changed by a rotary movement. Other kinds of throttle are possible. Alternatively, a diaphragm is conceivable, especially a variable diaphragm.

Further preferably, the cross section of the second flow path which is adjustable by the variable throttle is continuously adjustable. This enables a continuous adapting of the damper setting. Advantageously, multiple damper settings can be realized in this way.

Advantageously, the variable throttle is connected to an actuator, especially an electric drive, by which the cross section change of the second flow path is adjustable. In this way, the rotary valve can be controlled actively and/or passively.

Advantageously, the actuator is connected to an open-loop or closed-loop control unit, which adjusts the damper setting. In this way, in particular, an active adapting of the vibration damper during operation is possible. Moreover, it is conceivable for sensors, such as a stereo camera, to be connected to the open-loop or closed-loop control unit.

In another especially preferred embodiment, the first valve comprises at least one first spring element and the second valve at least one second spring element, the spring stiffness of the first spring element being greater than the spring stiffness of the second spring element. Spring elements are advantageous, because they enable an adjusting of the limit pressure. Alternatively, other kinds of pressure-dependent valves are possible.

The spring stiffness determines the force needed to accomplish a given deflection of the spring element. A large spring stiffness produces a greater force than a smaller spring stiffness.

Advantageously, the first and the second spring element each comprise at least one disc valve, especially an annular disc valve. In this way, the first and the second valve can be arranged coaxially, especially approximately concentrically. Hence, a space-saving arrangement of the first and the second valve is possible. Other spring elements are conceivable.

Especially advantageously, the spring stiffness of the first spring element is greater than the spring stiffness of the second spring element, such that in operation when the throttle is opened the damper fluid is led substantially through the second flow path and when the throttle is closed it is led substantially through the first flow path. This makes possible a switching between a hard damper setting and a soft damper setting or between a sporty setting and a comfort setting.

In another preferred embodiment, the check valve comprises a flat form spring, especially a truncated cone spring. This embodiment is advantageous because of the low costs.

It is advantageous for the first valve, the second valve and the check valve to be arranged coaxially. This can realize a compact, i.e., space-saving design of the valve unit.

Especially preferably, a first and a second valve unit are arranged outside the damper tube and are fluidically connected to the damper tube. This is advantageous, because now the valve units can be arranged freely outside the damper tube.

Advantageously, the first valve unit is associated with the compression stage and the second valve unit with the rebound stage. In this way, different damper settings can be implemented for the rebound stage and the compression stage.

Moreover, a vehicle having a vibration damper according to the invention is disclosed and claimed in the context of the invention.

FIG. 1 shows a schematic representation of a vibration damper 10. The vibration damper 10 comprises a damper tube 11. The damper tube 11 contains at least one damper fluid 12. A piston rod 13 with a piston 14 is guided axially in the damper tube 11. The piston 14 separates the damper tube 11 into two fluid regions. The first fluid region borders on a piston ring surface 23 and the second fluid region borders on a piston surface 24. In other words, the first fluid region is near the piston rod 13 and the second fluid region is away from the piston rod 13. The vibration damper 10 comprises two valve units 15, 15'.

If the subassembly formed by the piston rod 13 and the piston 14 and the damper tube 11 move relative to each other so that the volume of the second fluid region bordering on the piston surface 24 diminishes, one speaks of a compression stage. If the subassembly moves in the opposite direction, one speaks of a rebound stage.

The damper tube 11 comprises two schematically represented equalizing spaces 25, 25'. The equalizing spaces 25, 25' are formed, for example, as an annular gap positioned between the outer circumferential surface of the damper tube 11 and the inner circumferential surface of another tube surrounding the damper tube 11. The equalizing spaces 25, 25' are fluidically connected to a respective valve unit 15, 15'. The equalizing spaces 25, 25' shall be called here in the following the first and second equalizing space 25, 25'. The first equalizing space 25 is associated with the rebound stage and the second equalizing space 25' is associated with the compression stage.

The damper tube 11 is fluidically connected to the first valve unit 15 and the second valve unit 15'. The first valve unit 15 is associated with the rebound stage and the second valve unit 15' is associated with the compression stage. The first valve unit 15 is fluidically connected to the first fluid region bordering on the piston ring surface 23 and to the first equalizing space 25. The second valve unit 15' is fluidically connected to the fluid region bordering on the piston surface 24 and to the second equalizing space 25'.

The valve units 15, 15' comprise three flow paths A', B', C. The flow paths A', B', C' run parallel to each other. Flow path A' comprises a first pressure-dependent valve 16. Flow path B' comprises a second pressure-dependent valve 17 and a variable throttle 18. Flow path C' comprises a check valve 19.

The first and the second valve 16, 17 respectively comprise a spring element in the form of a disc valve. The respective disc valve is ring shaped. The disc valves respectively have a spring stiffness, the spring stiffness of the first valve 16 being larger than the spring stiffness of the second valve 17.

The flow direction through the first valve 16 runs from the fluid region bordering on the piston ring surface 23 to the first equalizing space 25. The flow direction through the second valve 17 runs from the fluid region bordering on the piston surface 24 to the second equalizing space 25'. The flow direction through the check valve 19 is opposite the flow direction of the first and second valve 16, 17.

During the rebound stage, damper fluid 12 is expelled from the fluid region bordering on the piston ring surface 23. The damper fluid 12 flows through the first valve unit 15 and is channelled into the first equalizing space 25.

The check valve 19 in the first valve unit 15 prevents the damper fluid 12 from flowing through the flow path C' during the rebound stage. During the compression stage, the check valve 19 of the first valve unit 15 allows the damper fluid 12 to flow from the first equalizing space 25 into the first fluid region bordering on the piston ring surface 23, and the check valve 19 of the second valve unit 15 allows the damper fluid 12 to flow from the second equalizing space 25' into the second fluid region bordering on the piston surface 24.

Accordingly, during the rebound stage flow can only occur through the valve unit 15 by the two flow paths A' and B'. The flow path is adjustable by the variable throttle 18 on account of the different spring stiffnesses of the first and second valve 16, 17.

Thanks to the variable throttle 18, the cross section of the second flow path B' can be adjusted at least partially. Basically the same pressure is acting on the first and the second valve 16, 17 on account of the parallel flow paths A', B', C'. The first and the second valve 16, 17 each have a limit pressure. By limit pressure is meant the pressure at which the respective first or second valve 16, 17 opens. The limit pressure is dependent on the spring stiffness of the respective spring element. The limit pressure of the first valve 16 on account of the greater spring stiffness of the disc spring is higher than the limit pressure of the second valve 17. The pressure for opening the first valve 16 must accordingly be greater than the pressure applied to the second valve 17.

When the throttle 18 is open, i.e., at maximum cross section of the second flow path B', the second valve 17 can be subjected to pressure by the damper fluid 12. The case of reaching the limit pressure of the first valve 16 when the throttle 18 is open usually cannot be achieved. The limit pressure of the second valve 17 is reached before the limit pressure of the first valve 16 is set. Hence, the second valve 17 opens, so that the pressure acting on the two valves 16, 17 decreases until the second valve 17 closes again.

When the throttle 18 is closed or partly closed, the second valve 17 is only subjectable to little pressure or no pressure at all. Hence, it is possible to reach the higher limit pressure of the first valve 16. Since in this case the dampening by the vibration damper occurs only at a greater application of force, the damper setting is set to hard.

In operation with a partly closed throttle 18, it is possible for vibrations with low amplitudes to be dampened by the second flow path B' and vibrations with large amplitudes by the first flow path A'. Vibrations with large amplitudes cause a greater pressure, which can build up fast enough to open the first valve 16 when the throttle 18 is partly open. At low amplitudes, the limit pressure of the first valve 16 is not reached and the damper fluid 12 flows through the second valve 17.

The above-described remarks regarding the first valve unit 15 during the rebound stage can be applied analogously to the second valve unit 15' during the compression stage.

Figure 2:
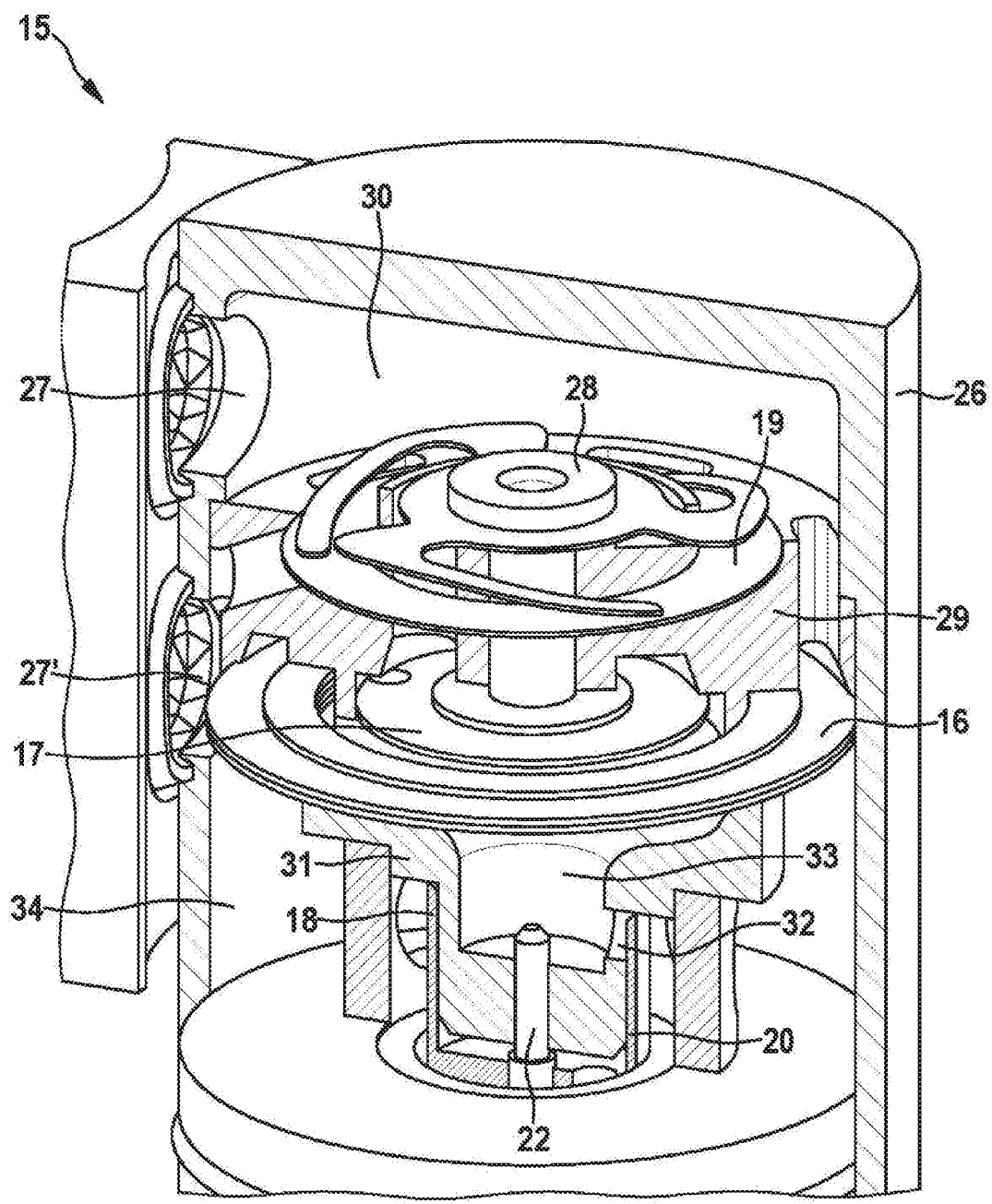
FIG. 2 is a sectional view of an exemplary embodiment of a valve unit.
Figure 3:
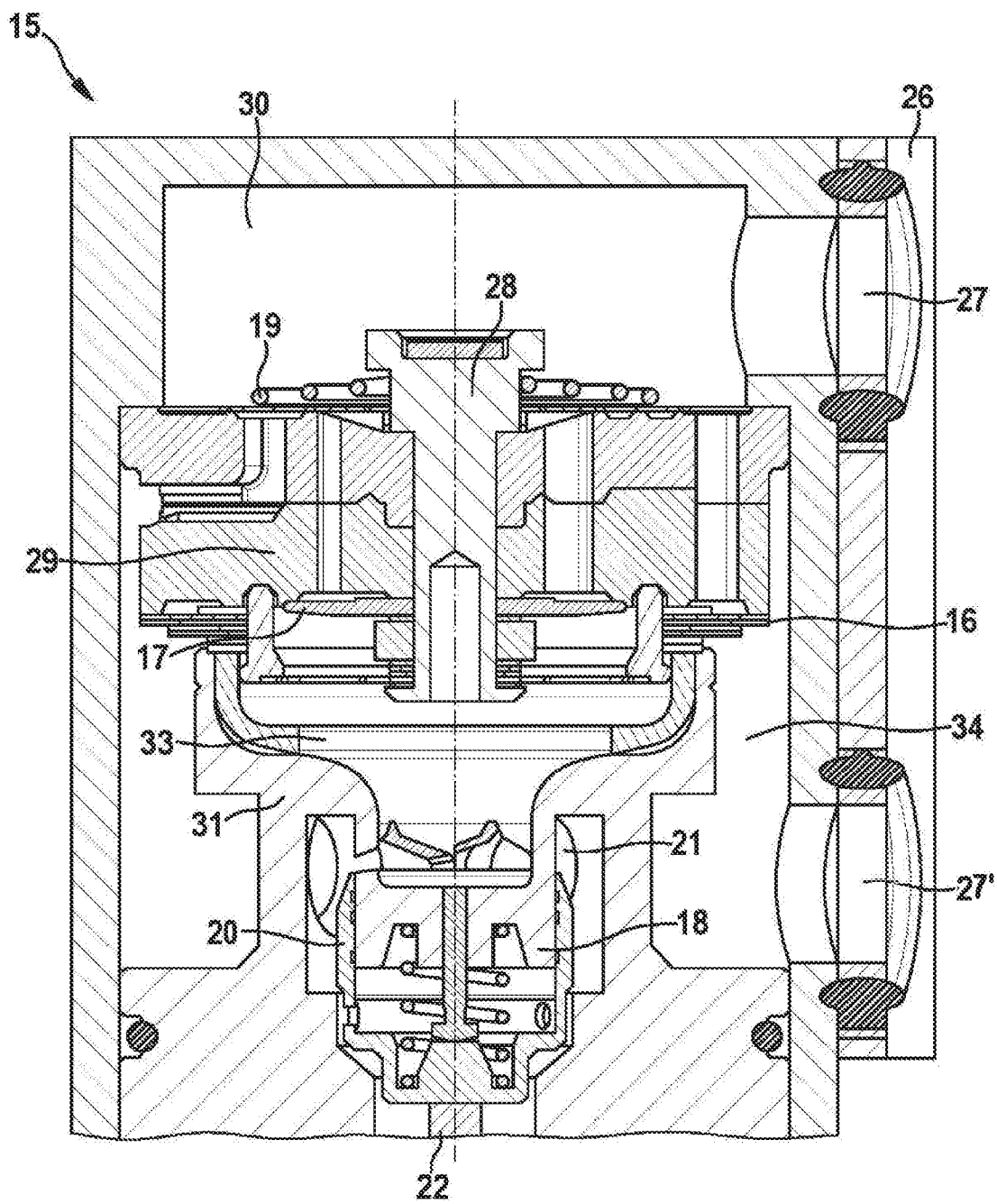
FIG. 3 is another sectional view of an exemplary embodiment of a valve unit.

FIGS. 2 and 3 show the layout of a valve unit 15 having the functions of the valve unit 15 known from FIG. 1. The valve unit 15 comprises a cylindrical housing 26. The valve unit 15 comprises a first and a second connection opening 27, 27' for the damper fluid 12, the connection openings 27, 27' being axially set off from each other. The two connection openings 27, 27' are both an inlet and an outlet for the damper fluid 12. The connection openings 27, 27' can be fluidically connected to the damper tube 11.

In the cylindrical housing 26 there is coaxially arranged a fixation element 28, especially a screw. A valve body 29 is coaxially arranged between the axial ends of the fixation element 28.

The valve body 29 has fluidic ducts. The ducts basically form the flow paths A', B', C. More precisely, the ducts form at least a portion of the flow paths A', B', C. Moreover, the valve body 29 comprises the check valve 19 and the first and the second valve 16, 17.

The first and the second valve 16, 17 are configured as ring-shaped disc valves. The first and the second valve 16, 17 are arranged coaxially and substantially concentrically.

The valve body 29 together with the inner wall of an end face of the cylindrical housing 26 delimits a free space 30. The check valve 19 is positioned at the axial end of the valve body 29 facing toward the free space 30. The free space 30 is fluidically connected through the first connection opening 27 to the damper tube 11.

The first and the second valve 16, 17 are arranged at the side of the valve body 29 facing away from the free space 30, as described above.

Moreover, a deflection body 31 is arranged at the side of the valve body 29 facing away from the free space 30. The deflection body 31 forms part of the second flow path B'. The deflection body 31 is basically cylindrical in shape, having a steplike enlargement of its diameter in the direction of the valve body 29. The deflection body 31 has a contour opening 32 on the circumference of the region with the smallest diameter.

The deflection body 31 has a cavity 33 on its inside. The cavity 33 is hood-shaped, the cavity 33 being open in the direction of the valve body 29 and being connected fluid-tight to the valve body 29. The cross section of the cavity 33 narrows in the direction facing away from the valve body 29.

At the end facing away from the valve body 29, a rotary valve 20 is arranged on the circumference of the cylindrical deflection body 31 on which the contour opening 32 is positioned. The rotary valve 20 is a hollow cylinder in particular; it is sleeve shaped. The rotary valve 20 can turn about the central longitudinal axis. The rotary valve 20 interacts with the contour opening 32, so that the cross section of the second flow path B' can be adjusted.

Around the deflection body 31 is arranged a further free space 34. The further free space 34 is fluidically connected to the second connection opening 27'. The free space 30 and the further free space 34 form a portion of the flow paths A', B', C'.

The rotary valve 20 can be connected to an actuator 22. By means of to the actuator 22, a rotation can be transmitted to the rotary valve 20. This enables an adapting of the damper setting by sensors and an open-loop and/or a closed-loop control unit.

LIST OF REFERENCE SYMBOLS

A' First flow path
B' Second flow path
C' Third flow path
10 Vibration damper
11 Damper tube
12 Damper fluid
13 Piston rod
14 Piston
15 First valve unit
15' Second valve unit
16 First valve
17 Second valve
18 Variable throttle
19 Check valve
20 Rotary valve
21 Through opening
22 Actuator
23 Piston ring surface
24 Piston surface
25 First equalizing space
25' Second equalizing space
26 Housing
27 First connection opening
27' Second connection opening
28 Fixation element
29 Valve body
30 Free space
31 Deflection body
32 Contour opening
33 Cavity (deflection space)
34 Further free space

What is claimed is:

1. A vibration damper for a motor vehicle, comprising:
   at least one damper tube provided with damper fluid;
   a piston rod comprising a piston guided axially in the damper tube; and
   at least one valve unit comprising at least three flow paths for the damper fluid:
   a first flow path comprising a first valve configured to generate a first damper setting,
   a second flow path comprising a second valve configured to generate a second damper setting and a variable throttle, and
   a third flow path comprising a check valve,
   wherein the second damper setting is softer than the first damper setting and the cross section of the second flow path is adjustable at least partially by the variable throttle.

2. The vibration damper of claim 1 wherein the variable throttle comprises at least one rotary valve having a through opening that is formed at least partially as a hollow cylinder and at least one part of the cross section of the second flow path is adjustable by a rotation of the rotary valve.

3. The vibration damper of claim 2 wherein the variable throttle is connected to an actuator by which the cross section change of the second flow path is adjustable.

4. The vibration damper of claim 3 wherein the actuator is connected to an open-loop or closed-loop control unit, which is configured to adjust the damper setting.

5. The vibration damper of claim 1 wherein at least a first and a second valve unit are arranged outside the damper tube that are fluidly connected to the damper tube.

6. The vibration damper of claim 5 wherein the first valve unit is operatively associated with the compression stage and the second valve unit is operatively associated with the rebound stage.

7. The vibration damper of claim 1 wherein the cross section of the second flow path which at least partly is adjustable by the variable throttle is continuously adjustable.

8. The vibration damper of claim 1 wherein the check valve comprises a flat form spring.

9. The vibration damper of claim 1 wherein the first valve, the second valve, and the check valve are arranged coaxially.

10. A vehicle having at least one vibration damper of claim 1.

11. A vibration damper for a motor vehicle, comprising:
    at least one damper tube provided with damper fluid;
    a piston rod comprising a piston guided axially in the damper tube; and
    at least one valve unit that comprises at least three flow paths for the damper fluid:
    a first flow path comprising a first valve configured to generate a first damper setting,
    a second flow path comprising a second valve configured to generate a second damper setting and a variable throttle, and
    a third flow path comprising a check valve, wherein the second damper setting is softer than the first damper setting and the cross section of the second flow path is adjustable at least partially by the variable throttle,
    wherein the first valve comprises at least one first spring element and the second valve comprises at least one second spring element, the spring stiffness of the first spring element being greater than the spring stiffness of the second spring element.

12. The vibration damper of claim 11 wherein the first spring element and the second spring element each comprise a disc valve.

13. The vibration damper of claim 11 wherein the spring stiffness of the first spring and the second spring element is such that in operation when the throttle is opened the damper fluid is led substantially through the second flow path and when the throttle is closed the damper fluid is led substantially through the first flow path.

* * * * *